United States Patent Office 3,412,074
Patented Nov. 19, 1968

3,412,074
2-HYDROXYALKYL ACRYLATE COPOLYMER-α,β-UNSATURATED DICARBOXYLIC ACID PARTIAL ESTERS
Kenneth S. Derrick, College Station, Tex., assignor to The Dow Chemical Company, Midland, Mich., a corporation of Delaware
No Drawing. Filed Aug. 7, 1964, Ser. No. 388,301
9 Claims. (Cl. 260—78.4)

This invention relates to polymer compositions and is more particularly concerned with partial esters of 2-hydroxyalkyl acrylate or methacrylate copolymers and α,β-unsaturated dicarboxylic acids, and thermosetting resins prepared from these partial esters.

The partial esters of the present invention are conveniently prepared by first copolymerizing a 2-hydroxyalkyl acrylate or methacrylate with one or a mixture of two or more other monoethylenically unsaturated monomers and, upon the completion of the copolymerization reaction, esterifying the resulting copolymer with an α,β-unsaturated dicarboxylic acid at a molar ratio of acid to hydroxyalkyl acrylate or methacrylate in the copolymer of 0.8:1 to 1.2:1.

The partial ester, when cured in the presence of a suitable curing agent and a vinyl aromatic hydrocarbon, provides clear infusible continuous castings and laminates having excellent strength heat, flame and solvent resistance.

The 2-hydroxyalkyl acrylate or methacrylate copolymers which may be reacted to prepare the partial esters of the present invention are copolymers containing in chemically combined form from about 20 to about 60 percent by weight, preferably from about 30 to about 40 percent by weight, of the 2-hydroxyalkyl acrylate or methacrylate and from about 40 to about 80 percent by weight, preferably about 60 to about 70 percent by weight, of one or more monoethylenically unsaturated monomers.

The 2-hydroxyalkyl acrylates or methacrylates which may be used to prepared the copolymers are preferably ones in which the 2-hydroxyalkyl group has from two to six carbon atoms.

Representative of such 2-hydroxyalkyl acrylate and methacrylate monomers include 2-hydroxyethyl acrylate and methacrylate, 2-hydroxypropyl acrylate and methacrylate, and 2-hydroxybutyl acrylate and methacrylate.

The monoethylenically unsaturated monomer which may be reacted with the 2-hydroxyalkyl acrylates to form the copolymers of the present invention can be any, or a mixture of two or more, vinylidene compounds such as styrene, vinyl toluene, t-butyl styrene, mono- and dichlorostyrene, vinyl chloride, vinylidene chloride and the like.

α,β-Unsaturated dicarboxylic anhydrides which can be reacted with the 2-hydroxyalkyl acrylate copolymers to form the partial esters include, for example, maleic anhydride, chloromaleic anhydride, citraconic anhydride, itaconic anhydride, and the like.

Suitable vinyl aromatic hydrocarbons with which the polymeric half esters of the present invention may be cured include monovinyl aromatic hydrocarbons of the benzene series such as styrene, vinyl toluene, ethyl vinyl benzene, isopropyl styrene, tert-butyl styrene, sec-butyl styrene or mixtures thereof. From about 20 to about 80 percent by weight of the vinyl aromatic hydrocarbon is mixed with the polymeric half ester to form the thermosetting compositions of the present invention.

The partial esters of the present invention are prepared by first copolymerizing from 20 to 60 percent by weight of a 2-hydroxyalkyl acrylate or methacrylate with from 40 to 80 percent by weight of one or a mixture of two or more of the monoethylenically comonomer compounds, preferably while the reactants are dissolved or suspended in an organic solvent, e.g. xylene, toluene, benzene, ethylbenzene, methyl ethyl ketone, acetone, methyl isobutyl ketone, carbon tetrachloride or mixtures of said solvents, and at room temperature or thereabout, or at elevated temperatures up to 180° C., preferably at temperatures of 60° to 100° C., in the presence of a suitable free radical generating catalyst such as benzoyl peroxide, lauroyl peroxide, and the like and at atmospheric, superatmospheric pressure.

Upon completion of the copolymerization reaction, the α,β-unsaturated dicarboxylic acid anhydride is added to the polymerization medium at a molar ratio of acid anhydride to hydroxyl alkyl acrylate or methacrylate in the copolymer of about 0.8:1 to about 1.2:1 and the partial esterification run at reaction temperature, i.e. in the range from about 60° to 100° C.

Advantageously a free radical inhibitor such as hydroquinone, 2,5 - diphenyl-p-benzoquinone, 2,5 - ditertiary butyl hydroquinone, or 4-dodecyloxy-2-hydroxybenzophenone in amounts ranging from 0.005 to 0.1 percent by weight is added to the polymerization medium to prevent the free radical polymerization of the unsaturated acid anhydride to undesirable polymers.

The hydroxyl groups in the copolymer readily react with the α,β-unsaturated dicarboxylic acid anhydrides to form the corresponding dicarboxylic acid half esters.

Thermosetting resin-forming compositions may be prepared by mixing from about 20 to about 80 percent by weight of the dicarboxylic acid half ester of the 2-hydroxyalkyl acrylate copolymer with from about 80 to about 20 percent by weight of the vinyl aromatic hydrocarbon. The vinyl aromatic hydrocarbon is added and intimately mixed with the polymeric half ester in the polymerization medium upon completion of the esterification reaction. The most desirable thermosetting resins are produced from reaction mixtures of polymeric half ester and a vinyl aromatic hydrocarbon containing from 40 to 60 percent by weight of the polymeric half ester.

The polymerization solvent is then removed, and the resultant mixture, a solution of the polymeric half ester in the vinyl aromatic hydrocarbon may then be cured to an infusible, solvent resistant resin by the application of heat and pressure in the presence of air.

In this connection, it may be mentioned that peroxy catalytic agents such as benzoyl peroxide, lauroyl peroxide, methyl ethyl ketone peroxide and the like can advantageously be incorporated in the vinyl aromatic solution of the polymeric half esters, prior to their being cured, to hasten the converting of the solution into an insoluble solvent resistant film. To further accelerate the curing of the coating, accelerating agents such as cobalt naphthenate, lead naphthenate, dimethyl aniline and the like may also be added to the polymeric half ester solution.

Advantageously, the peroxy catalytic compounds are included in the polymer solutions at a concentration of about 0.1 to about 5 percent by weight based on the total weight of the polymer solution, and the accelerating agents are employed in the concentration range of about 0.01 to about 5 percent by weight based on the total weight of the solution.

The solution may be cured over the temperature range of 25° to 140° C. At room temperature, the cure may require several months, although the presence of the above-mentioned catalysts and accelerating agents can shorten this to a few days. At elevated temperatures such as 100° to 140° C. and in the presence of the mentioned curing agents, and the application of pressure in the range of 50 to 500 p.s.i., the cure may be accomplished in less than 1 minute. Preferred curing temperatures are generally 110° to 130° C. at pressures of 100 to 300 p.s.i. for times ranging from 1 to about 5 minutes.

The polymeric partial esters of the present invention, when cured in the presence of a vinyl aromatic hydrocarbon, may be utilized for a wide variety of applications. For example, they are very useful in the preparation of pottings and castings. In this application, the polymeric partial ester dissolved in the vinyl aromatic hydrocarbon which acts both as a solvent and curing agent for the half ester product, is mixed with suitable curing catalysts and the mixture is poured into a suitable mold or form and then allowed to set at room temperature. Heat may be applied in some cases to hasten the cure.

The polymeric half esters are also useful in the preparation of laminates. In this application, fibrous sheets are first impregnated with the solution of the polymeric half ester product dissolved in the vinyl aromatic solvent, along with suitable curing catalysts. The sheets of fibrous material are impregnated with the mixture by spreading it thereon or by dipping or otherwise immersing them in the impregnant solution. A plurality of the impregnated sheets are then superimposed and the assembly is cured in a heated press under a pressure of about 200 to about 1000 or more pounds per square inch.

The resulting laminate is extremely strong and resistant against the action of organic and aqueous solvents, and exhibits excellent resistance to the action of ultraviolet light. The fibrous material used in the preparation of the laminates may be of any suitable material, such as glass cloth and matting, paper, asbestos paper, mica flakes, cotton bats, duck, muslin, canvas and the like.

In the above applications, the resulting cured products are characterized by their excellent hardness, strength, durability and good solvent resistance as well as by lack of discoloration which accompanies many of the other polyester cured systems.

The invention is illustrated more particularly by way of the following examples but, as will be more apparent, is not limited to the details thereof.

Example 1

Into a reaction vessel equipped with a means for stirring, temperature control and purging, were placed 10 pounds of methyl ethyl ketone, 4 pounds of 2-hydroxyethyl acrylate, 6 pounds of styrene and 0.33 pound of benzoyl peroxide. The reaction vessel was purged with nitrogen, closed, and the temperature was raised to 85° C. and maintained thereat for 24 hours while the mixture was stirred. At the end of this 24 hour period, the solution was found to contain 49 percent polymer solids which indicated the polymerization reaction was essentially complete.

The reaction vessel was cooled to room temperature and 7.0 grams of hydroquinone and 3.3 pounds of maleic anhydride were added. This mixture was then stirred and heated for 10 hours at 85° C. At the end of this time period, the reaction was complete, with the formation of the half ester of maleic acid. The reaction vessel was cooled to room temperature and 14 pounds of styrene was added to the polymer solution. The methyl ethyl ketone solvent was removed under reduced pressure. The devolatilized polymer solution, pale yellow in color, had a viscosity of 35 poise at 25° C. and contained about 50 percent polymer solids and about 50 percent styrene monomer.

To 100 grams of this solution was added 1 gram of benzoyl peroxide, and pieces of glass cloth (United Merchants No. 1542, woven fiber glass tape 8.502 oz. sq. yard, Vorlan A finish) was saturated with the catalyzed solution by repeated dipping.

Twelve plys of the treated cloth were stacked and held in a flat press at 138° C. and 50 p.s.i. pressure for 30 minutes. The resulting laminate had the following properties:

|  | P.s.i. |
|---|---|
| Flexural strength (ASTM D790–59T) | 15,000 |
| Flexural strength, 2 hr. water boil | 21,500 |

The solvent resistance of the laminate to water and toluene as determined by ASTM Test No. D543–56T was rated as excellent.

A charge of 100 grams of the copolymer half ester-styrene solution was intimately mixed with 1 gram methyl ethyl ketone peroxide and 0.5 gram cobalt naphthenate and poured into a mold made by spacing two metal plates 1/8" apart with plastic tubing. The mixture was allowed to remain in the mold for 16 hours, after which time the cast sheet was removed from the mold. The cast sheet was found to be colorless, infusible, insoluble in water, aromatic hydrocarbons and ketones and had the following physical properties:

| | |
|---|---|
| Flexural strength (ASTM D790–59T), p.s.i. | 11,000 |
| Heat distortion temp. (ASTM D648–56), ° F. | 190 |
| H₂O absorption (ASTM D570–59aT), 24 hrs., percent | 0.15 |
| Toluene absorption (ASTM D570–59aT), 24 hrs., percent | 0.10 |

Example 2

Into a reaction vessel equipped with a means for stirring, temperature control and purging were placed 10 pounds of methyl ethyl ketone, 8 pounds of vinylidene chloride, 4 pounds of 2-hydroxyethyl acrylate, 2 pounds of styrene and 0.33 pound of benzoyl peroxide. The reaction vessel was purged with nitrogen, closed and the temperature was raised to 80° C. and maintained thereat for 16 hours while the mixture was stirred. At the end of this period, the solution was found to contain 50 percent solids which indicated the polymerization reaction was essentially complete.

The reaction vessel was cooled to room temperature and 7.0 grams of hydroquinone and 3 pounds of maleic anhydride were added. This mixture was then stirred and heated for 12 hours at 80° C. At the end of this time period, the reaction was complete, as shown by analyzing for percent acid in the resin. This was found to be 5.5 percent and the temperature was lowered to 25° C.

The reaction vessel was cooled to room temperature and 10 pounds of styrene was added to the polymer solution. The methyl ethyl ketone solvent was removed under reduced pressure. The amber colored polymer solution was found to have a viscosity of 50 poise and 25° C. and contained 50 percent polymer solids and 50 percent styrene monomer.

A charge of 100 grams of the terpolymer half ester-styrene solution was intimately mixed with 1.5 grams methyl ethyl ketone peroxide and 0.5 gram cobalt naphthenate and poured into an 18 inch metal sheet mold. The mixture was allowed to remain in the mold for 24 hours, after which time the cast sheet was removed from the mold. The cast sheet was found to be colorless, infusible, insoluble in water, aromatic hydrocarbons and ketones and had the following physical properties:

| | |
|---|---|
| Flexural strength (ASTM D790–59T), p.s.i. | 12,000 |
| Heat distortion temp. (ASTM D648–56), ° F. | 140 |
| Flame resistance (ASTM D635–56T) | Self-extinguishing |
| Toluene absorption (ASTM D570–59aT), 24 hrs., percent | 1.02 |
| H₂O absorption (ASTM D570–59aT), 24 hrs., percent | 0.15 |

In place of the 2-hydroxyethyl acrylate used in the reaction of Example 2, there can be substituted an equivalent amount of another 2-hydroxyalkyl acrylate-type compound mentioned above such as 2-hydroxyethyl methacrylate, 2-hydroxypropyl acrylate and the like, and in place of the vinylidene chloride and styrene used in this example, there can be substituted an equivalent amount of one or more of the above-mentioned monoethylenically unsaturated compounds enumerated above such as vinyl toluene, dichlorostyrene, vinyl chloride and the like to prepare copolymers which can be reacted with equivalent amounts of α,β-monoethylenically unsautrated dicarboxylic acid anhydrides such as maleic anhydride, citraconic anhydride and itaconic anhydride to prepare half esters which can be reacted and cured in the presence of a vinyl aromatic monomer such as styrene, vinyl toluene, ethyl vinyl benzene and the like to produce clear, infusible coatings and laminates having excellent strength, heat and solvent resistance.

What is claimed is:

1. A thermosettable resin composition which comprises the product of reaction of (A) an α,β-unsaturated dicarboxylic acid anhydride with (B) a copolymer containing pendant hydroxyl groups; the molar ratio of the anhydride to the hydroxyl group being in the range of 0.8:1 to about 1.2:1 and the copolymer comprising about 20 to about 60 percent by weight of a 2-hydroxyalkyl ester of acrylic acid or methacrylic acid and about 80 to about 40 percent by weight of at least one other copolymerizable monomer selected from the group consisting of vinyl aromatic monomers, vinyl chloride and vinylidene chloride.

2. The resin composition of claim 1 wherein the anhydride is maleic anhydride.

3. The resin composition of claim 1 wherein the 2-hydroxyalkyl ester is 2-hydroxyethyl acrylate.

4. The resin composition of claim 1 wherein the vinyl aromatic monomer is styrene.

5. The resin composition of claim 1 wherein the copolymer is a copolymer of styrene and 2-hydroxyethyl acrylate.

6. The resin composition of claim 1 wherein the copolymer is a copolymer of vinylidene chloride and 2-hydroxyethyl acrylate.

7. A thermosettable composition comprising from about 20 to about 80 percent by weight of a polymerizable vinyl aromatic hydrocarbon and from about 80 to about 20 percent by weight of a resin, said resin comprising essentially the composition of claim 1.

8. The composition of claim 7 wherein the vinyl aromatic hydrocarbon is styrene.

9. An infusible, insoluble composition comprising essentially the heat-cured product of claim 7.

References Cited

UNITED STATES PATENTS

| | | | |
|---|---|---|---|
| 2,971,946 | 2/1961 | Hayes et al. | 260—78.4 |
| 3,277,036 | 10/1966 | Whitworth et al. | 260—78.5 |
| 3,150,118 | 9/1964 | Clemins | 260—86.1 |

FOREIGN PATENTS

| | | |
|---|---|---|
| 839,773 | 6/1960 | Great Britain. |

JOSEPH L. SCHOFER, *Primary Examiner.*

J. C. HAIGHT, *Assistant Examiner.*